March 24, 1931.    R. TRUESDALE ET AL    1,797,249
APPARATUS FOR THE MANUFACTURE OF CORDS OR STRINGS
Filed Jan. 18, 1927    3 Sheets-Sheet 2
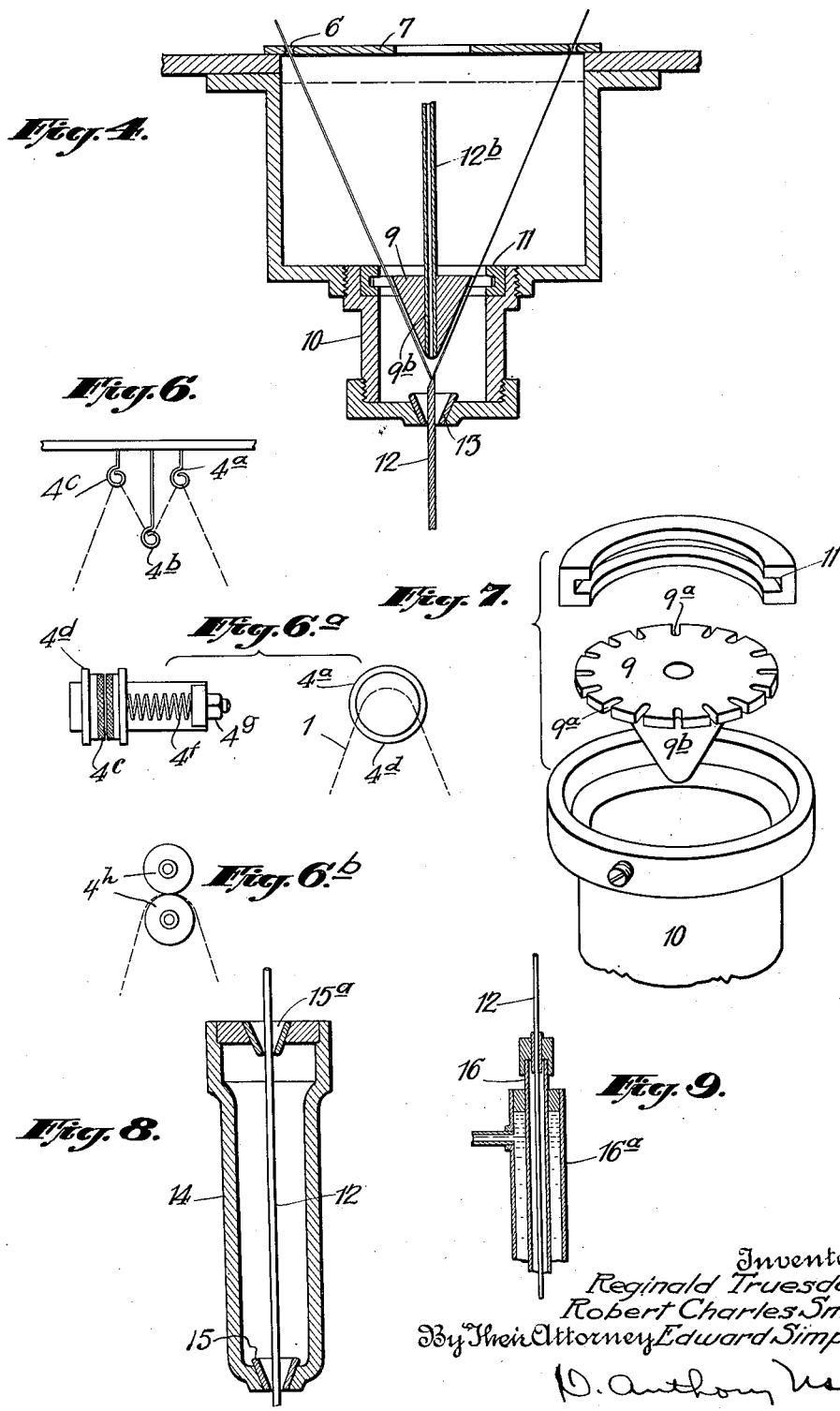
Inventor
Reginald Truesdale.
Robert Charles Smith.
By their Attorney Edward Simpson.

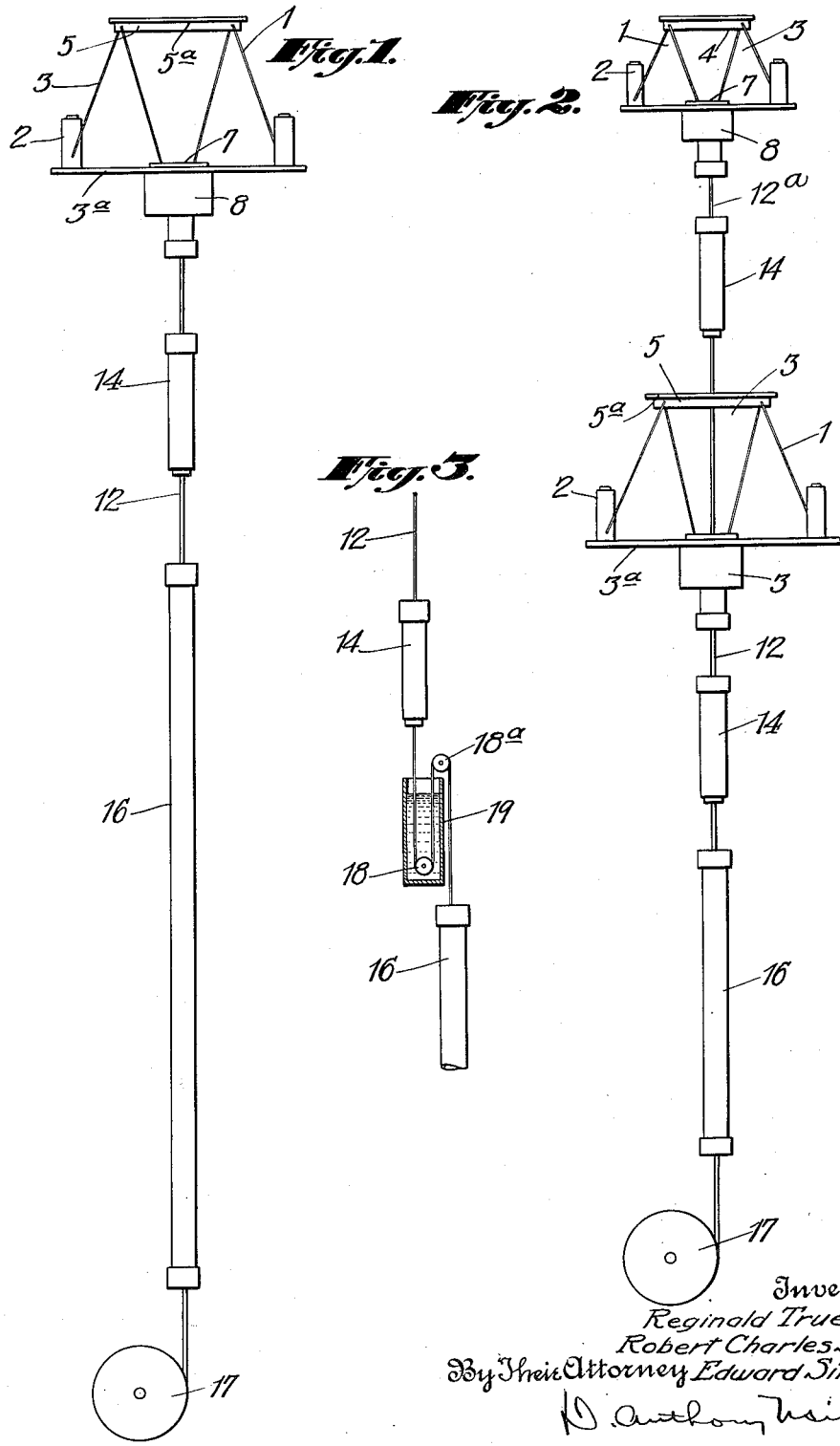

March 24, 1931. R. TRUESDALE ET AL 1,797,249
APPARATUS FOR THE MANUFACTURE OF CORDS OR STRINGS
Filed Jan. 18, 1927 3 Sheets-Sheet 3

Inventor
Reginald Truesdale.
Robert Charles Smith.
By their Attorney Edward Simpson.

Patented Mar. 24, 1931

1,797,249

UNITED STATES PATENT OFFICE

REGINALD TRUESDALE, ROBERT CHARLES SMITH, AND EDWARD SIMPSON, OF ERD-INGTON, BIRMINGHAM, ENGLAND, ASSIGNORS TO THE DUNLOP RUBBER COMPANY, LIMITED, OF FORT DUNLOP, ENGLAND, A CORPORATION OF GREAT BRITAIN

APPARATUS FOR THE MANUFACTURE OF CORDS OR STRINGS

Application filed January 18, 1927, Serial No. 161,736, and in Great Britain July 7, 1926.

This invention relates to apparatus for use in the manufacture of cords or strings such as may be used as substitutes for gut or similar products for use as strings in racquets for lawn tennis nets, fishing lines or the like, or for the strings of musical instruments.

According to this invention we provide apparatus for the manufacture of cords or strings whereby the various threads of which such cords or strings are made up are impregnated with a suitable solution, twisted, vulcanized and dried or coagulated or dried and coiled up.

The threads of silk, ramie, cotton, wool, hemp, jute, artificial silk, or other fibres or fine threads are mounted upon bobbins or the like upon a revolving creel, passed through a bath and impregnated with a suitable solution which may incorporate a viscous solution of cellulose or a solution of rubber, gutta percha or balata, and twisted together. The cord thus formed may be passed through a coating chamber wherein the outside of the cord receives a coating of solution of suitable thickness and again through a coagulating bath or a vulcanizing or drying chamber which latter is suitably heated to vulcanize a solution requiring vulcanization or to dry one not requiring vulcanization. The cord is then wound up on to a drum when it is ready for use.

In a modification where it is desired to provide the cord or string with a central core or cord an additional unit consisting of creel, impregnating bath, twisting device and coating chamber and, where necessary, a coagulating chamber may be provided to produce the inner cord and this is passed through a second creel whereby further threads are twisted upon the same after impregnation. Further units may be provided as desired to produce a cord having several layers.

In order that our said invention may be clearly understood and readily carried into effect the same is now more fully described with reference to the accompanying drawings in which—

Fig. 1 is a front view of apparatus according to our invention.

Fig. 2 illustrates a modification thereof where a central cord is to be used.

Fig. 3 illustrates apparatus provided with a coagulating bath.

Fig. 4 illustrates in cross section apparatus carrying the impregnating bath and twisting device.

Figs. 6, 6a, 6b, are detail views showing various tensioning devices.

Fig. 7 is a perspective detail view of the twisting device.

Fig. 8 shows a section of the coating chamber.

Fig. 9 shows a section of a heat treating chamber.

Figure 5:
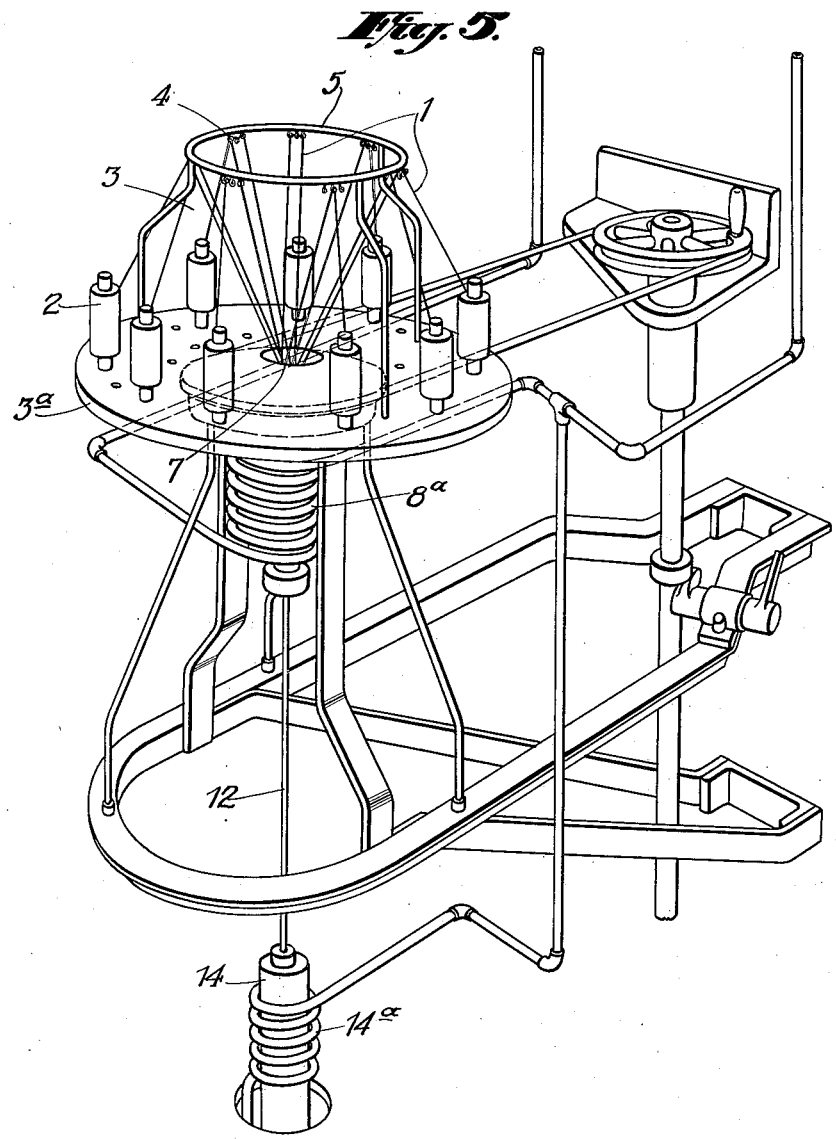
Fig. 5 is a perspective view of a slightly modified creel.

Referring to the drawings, the threads 1 are shown as wound on bobbins 2 but it will be apparent that any of the other formations such as "cheeses" may be utilized with slight modification to the apparatus as desired. In the drawings only one circle of bobbins is shown but it will be apparent that the number may vary according to the thickness of the cord it is desired to produce. The said bobbins 2 are mounted upon a revolving creel 3 which may be rotated by any known means having due regard to the requirements hereinafter set out. The threads or strands 1 pass from the bobbins 2 through guides 4 in a frame 5 rigidly supported on the base 3a of the creel 3 and from thence through holes 6 in a guide plate 7 into the impregnating bath 8.

The said guides 4 may be constituted by holes in an annular flange 5a of the frame 5 through which holes the threads pass direct from the bobbins to the guide plate 7. Alternatively the said guides may be so arranged that they constitute tensioning devices.

For instance when it is desired to produce the type of cord known as Grandrelle cord wherein one of the threads is of a different colour to the remainder it is necessary to provide means whereby the said thread shall be kept always on the outside of the cord.

In the apparatus illustrated in Figs. 5 and 6, that end is achieved by increasing the tension in all the cords other than the coloured cord and in one form of our apparatus we utilize the principle that the tension in a cord is increased when the said cord is deflected.

Referring to Figs. 5 and 6 the ordinary cords pass from the bobbins to the first loop 4a of the guide 4 and from thence through the loops 4b and 4c to the guide plate 7. The coloured cord passes through the loop 4b only therefore its tension is less and it tends always to twist to the surface of the resultant cord.

We do not limit ourselves to this method of tensioning the cords as for instance we may substitute for the multilooped guide a guide which utilizes the principle that the tension in a thread varies according to the pressure exerted upon it between two opposing surfaces. Referring to Fig. 6a the thread passes from the bobbins between two discs 4d faced with felt 4e and means, for instance adjustable springs 4f, are provided to vary the pressure exerted by the said discs upon the thread. The said springs may be controlled by the nuts 4g or alternatively by an annular member provided with wedge faces adapted to compress the springs the desired amount but this latter arrangement is not shown in the drawings.

In a modification as shown in Fig. 6b instead of the discs we employ rollers 4h between which the threads pass on their way to the impregnating bath 8 the pressure exerted by the rollers upon the thread being variable by any suitable means as for instance by adjustable springs, not shown in the drawings.

From the said guides the threads pass via the guide plate 7, into the impregnating bath 8 and through the said bath to the twisting device. Referring to Figs. 4 and 7 the guide 9 is mounted in chamber 10 which also preferably contains the impregnating solution. To facilitate threading, the guide 9 as shown in Fig. 7, is provided with slots 9a rather than holes and is held rigidly in position in the chamber 10 by a divisible locking ring 11. The said guide is provided with a conical extension 9b which is adapted to prevent the threads twisting so far back towards the said guide as to cause them to break by reason of the acute angle at which they would then be twisted. The threads on entering the bath 8 become impregnated with the composition therein contained and are then twisted to form the cord 12 while still immersed in the impregnating composition in the extension 10. It will be understood that this twisting is accomplished in the space between the extension 9b of the guide 9 and the outlet orifice 13, usually taking place nearer the extension 9b as indicated in Fig. 4.

The twisted threads pass out in the form of cord 12 through a die 13 which is preferably of glass and which coats the said cord 12 with a thin film of solution.

The cord then passes through the coating chamber 14 from whence it passes through a further die 15 of just sufficient aperture to ensure that a coating of the requisite thickness is applied to the said cord. The die 15 is preferably of glass which we have found gives the cord the smoothest possible finish.

We may associate with the said coating chamber a further die or dies 15a adapted to reduce initially the diameter of the cord the threads whereof are held slightly separated by the impregnating solution.

The impregnating bath vessel 8 and the coating chamber 14 may be heated as shown in Fig. 5 by coiled steam pipes 8a and 14a respectively.

From the said coating chamber the cord passes into the vulcanizing or drying chamber 16 which may be simply a length of tubing suitably heated, as for instance by maintaining a current of hot air therethrough, or by enclosing the same in a spiral steam pipe, to vulcanize a solution requiring vulcanization or merely to dry or solidify a solution not requiring vulcanization.

Alternatively as shown in Fig. 9 the said chamber 16 may be enclosed in a further chamber or jacket 16a through which hot air or steam may be caused to circulate. In this construction the said chamber 16 may be utilized as a chilling chamber, when vulcanization of the product is complete cold water or air being circulated through the enclosing jacket 16a in place of the hot air or steam. Fig. 9 shows only the top end of the chamber it being understood that the opposite end is arranged in a manner substantially similar thereto.

The cord is then wound up onto a drum 17 when it is ready for use.

The speed at which the said drum rotates is so arranged with relation to the speed of rotation of the creel that just sufficient tension is given to the cord to characterize the resultant product with the requisite twist.

Alternatively we may arrange for the cord to be held elsewhere in its path, for instance by the die or dies in the coating chamber 14.

When a cellulose solution requiring coagulation is used as the impregnating medium, the cord 12 after leaving the coating chamber 14, is guided by the pulleys, 18 and 18a through a bath 19 containing a suitable coagulant, for instance sulphuric acid and sodium sulphate, and from thence through the drying chamber 16 to the coiling drum 17.

Where it is desired to produce a composite cord, that is to say a cord having a central core of any suitable material and one or more coverings of fibres or fine threads, we provide the required number of units, consisting of creel, impregnating bath, twisting device, and coating chamber and as required, coagulating, both as exemplified in Fig. 2 which illustrates the production of a cord composed of a central core 12a and one covering 12, both being formed as hereinbefore described. A guiding tube 12b, Fig. 4, for the core is provided through the twisting device of the lower or intermediate units. Where the core consists of a material other than fibres or fine threads twisted as herein described, the uppermost unit may be dispensed with and the said core reeled direct from a suitable stock roll. As indicated in Fig. 4 the diameter of the die 13 is preferably slightly larger than that of the twisted threads so as to coat the latter with a thin coating film rather than to tightly grip or scrape the cord 12.

While we have described quite specifically the construction and arrangement of apparatus herein illustrated, it is not to be construed that we are limited thereto since various modifications and substitution of equivalents may be made by those skilled in the art without departing from the invention as defined in the appended claims.

What we claim is:—

1. An apparatus of the character described including a rotary creel carrying a plurality of upright strand supporting bobbins, guiding members supported on the creel and located in a plane above said bobbins, a member carried by the creel for holding an impregnating bath, and having an outlet opening for a cord, a plate having strand guide notches in its periphery, means for detachably securing said plate to the creel, a substantially cone-shaped member secured to the underside of said guide plate and adapted to guide the strands within said bath carrying member, said cone shaped member being spaced from said outlet opening.

2. An apparatus of the class described including a rotary creel carrying a plurality of upright strand supply bobbins, strand guiding members carried by the creel and located in a plane above said bobbins, certain of said guiding members being arranged to exert a greater tension on the strands than others, a member carried by the creel arranged to hold an impregnating bath and having an outlet opening for a cord of twisted strands and means for guiding the strands through said bath, said guiding member including a plate slotted at its periphery and having a cone-shaped portion secured thereto projecting into and spaced from the opening in said bath carrying member.

3. An apparatus of the class described including a rotary creel carrying a plurality of upright strand supply bobbins, strand guiding members carried by the creel and located in a plane above said bobbins, certain of said guiding members being arranged to exert a greater tension on the strands than others, a member carried by the creel arranged to hold an impregnating bath and means for guiding the strands through said bath, a glass die having a converging central cavity therein secured in a tapered seat formed in the bottom of said bath carrying member and means for guiding strands into a cord above said opening.

In witness whereof, we have hereunto signed our names.

REGINALD TRUESDALE.
ROBERT CHARLES SMITH.
EDWARD SIMPSON.